Patented Aug. 29, 1944

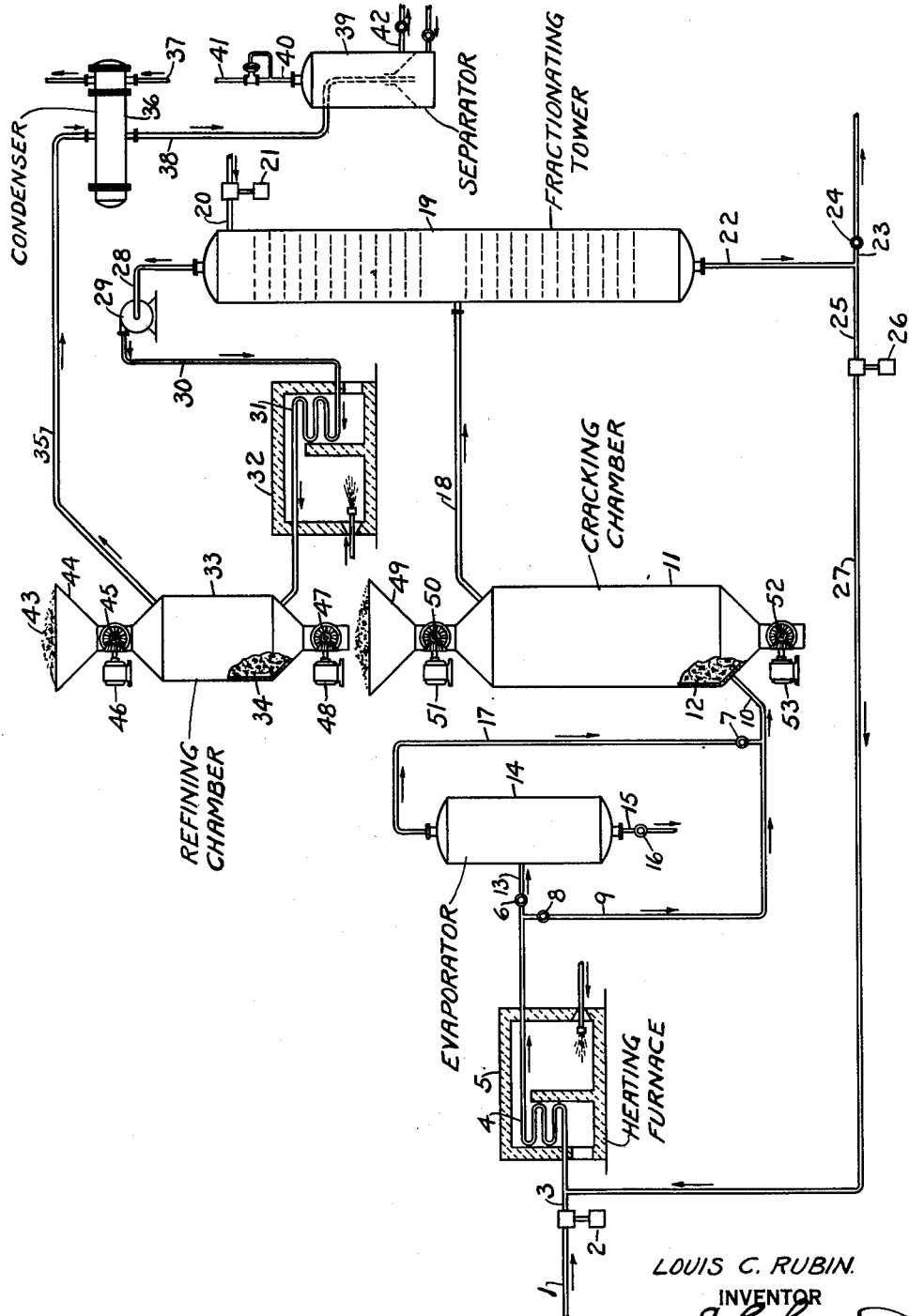

2,357,136

UNITED STATES PATENT OFFICE 2,357,136

METHOD OF CATALYTICALLY CONVERTING HYDROCARBON OILS

Louis C. Rubin, West Caldwell, N. J., assignor to The M. W. Kellogg Company, Jersey City, N. J., a corporation of Delaware Application February 28, 1941, Serial No. 381,040

12 Claims. (Cl. 196—52)

This invention relates to the treatment of hydrocarbon oil mixtures, such as cracked gasoline, to remove therefrom color-imparting and gum-forming constituents. More particularly, the invention relates to a process for catalytically cracking hydrocarbon oil and treating gasoline constituents thus obtained to separate therefrom color-imparting and gum-forming constituents.

In the preparation of certain hydrocarbon oils, particularly cracked gasoline, for commercial use, it is necessary to provide treatment of such oil to effect removal therefrom of constituents which, during storage or use, form materials which impart color to the oil or form gums which are deleterious in the use of the oil.

A method in extensive use for the treatment of cracked gasoline to remove color-imparting and gum-forming constituents therefrom involves the passage of such gasoline, in the vapor phase, through a stationary body of finely divided solid adsorbent material such as fuller's earth. In this way the undesired constituents are polymerized to products which are higher boiling than the gasoline and can be separated therefrom, either in the treating zone or by subsequent fractionation. At least a portion of the polymers thus formed are separated as liquid in the treating zone and are deposited upon the surface of the catalytic material, such as fuller's earth, which is employed. The accumulation of such polymers in the treating zone results in rapid deactivation of the catalytic material, so that it is necessary to effect prompt and continuous removal of such polymers from the treating zone in order to prolong the activity of the catalytic material and effect the treatment of a sufficient quantity of gasoline per unit quantity of catalytic material employed.

Continuous removal of polymers which are separated in the treating zone and substantial separation of polymer products from the treated vapors are effected by maintaining the reaction temperature in the treating zone sufficiently low whereby the polymer products and a portion of the vapors undergoing treatment are condensed within the treating zone. In this manner there is formed a liquid which is sufficiently fluid to drain promptly through and out of the body of catalytic material. Rapid drainage of the condensate liquid is promoted also by passing the vapors through the body of catalytic material in a downward direction. Ordinarily the gasoline vapors are passed into the treating zone at their dew point. The formation of the higher-boiling polymers during passage of the vapors through the treating zone lowers the dew point of the mixture, however, with the result that a condensate is formed which contains most of the polymer products and a substantial proportion of gasoline constituents. This condensation occurs even though the temperature of the vapors may be increased somewhat during their passage through the treating zone because of the exothermic nature of the polymerization reaction which occurs therein. Removal of polymers in this manner from the treating zone minimizes but does not prevent deactivation of the catalytic material which results from the gradual accumulation of deactivating deposits in the form of high-boiling polymers which are carbonized or highly adsorbed whereby they are not removed by drainage of the condensate. Consequently, periodical replacement, or revivification, of the catalytic material is necessary.

This method requires, therefore, that the operating temperature shall be at least at the dew point of the vapor mixture undergoing treatment but not sufficiently above the dew point to cause vaporization of polymers and prevent condensation of a portion of the vapors undergoing treatment. Since the refining reaction involves polymerization the velocity of the reaction increases with increasing temperature. The possibility of increasing the refining capacity of the catalytic material by the use of relatively high treating temperatures is limited, however, by the requirement that the temperature in the treating zone be maintained sufficiently low to effect condensation to a degree sufficient to promote the necessary rapid drainage of polymers from the treating zone.

The velocity of the polymerization refining reaction may be increased also by increasing the pressure maintained in the treating zone, and it is possible by this means to increase the refining capacity of the catalytic material employed. Improvement in this direction, however, is limited by the increased cost of equipment incident to the use of high operating pressures.

In treating cracked gasoline under the conditions described above and particularly when employing a catalytic material having a relatively mild catalytic action, such as fuller's earth, it is necessary ordinarily in order to effect the desired refining action to provide for a substantial contact time, expressed ordinarily as barrels of oil per ton of catalytic material per hour. However, in operating under such mild conditions the polymerizing reactions are limited substantially to those constituents which are undesired. There is no objection, therefore, to a contact time longer than necessary, and since the economics of this method favor the use of relatively large bodies of catalytic material the size of such bodies is limited ordinarily only by the pressure drop required for the passage of the vapors therethrough.

It is an object of this invention to provide a method for the treatment of cracked gasoline, or other hydrocarbon oil, to effect removal of color-imparting and gum-forming constituents therefrom, in which the refining capacity of the catalytic material is substantially increased and in which the necessity for condensation and removal of polymers from the treating zone is obviated. It is a further object of the invention to provide a process for the treating of cracked gasoline and the cracking of a hydrocarbon oil in which the same catalytic material is employed for the treating operation and for the cracking operation, and the properties of the catalytic material employed in one of such treatments are improved by the preliminary use of such catalytic material in the other of such treatments.

It is found that finely divided solid materials which are suitable as polymerization catalysts in the treatment of hydrocarbon oils to remove color-imparting and gum-forming constituents therefrom are generally suitable also, at different operating conditions, for promoting cracking of hydrocarbon oils. It is found also that variations in the catalytic activity of such materials for either the polymerizing or cracking reaction are reflected also in the variations in activity of such materials for the other reaction. This relationship is particularly true of solid catalytic materials consisting of combinations of silica and alumina. Catalytic materials of this nature include naturally occurring materials such as clays including fuller's earth and bentonite, acid-treated clays such as that marketed under the trade name "Super-filtrol," and synthetic combinations of silica and alumina formed by co-precipitation, or impregnation, of silica gel with alumina.

Catalytic materials particularly suitable for use in this invention are clays which have been activated by suitable acid treatment and synthetic combinations of alumina and silica consisting essentially of silica and alumina in a ratio not substantially less than 6:1. Suitable synthetic catalytic material may be prepared by hydrolytic adsorption of alumina by silica gel from a solution of a hydrolyzable salt of alumina, or by impregnation of silica gel with an aluminum salt followed by conversion of the salt to alumina by calcination or by precipitation. A suitable combination of silica gel and alumina may be prepared also by co-precipitation of silica and alumina. Mixtures of silica and alumina suitable for use in this invention may be prepared also by grinding silica and alumina in the presence of water to effect homogenization. Preferably the silica or the alumina is employed in the last-mentioned method in the gel form.

Catalytic materials of the character described above are suitable for the refining of hydrocarbons in the manner described above and also are highly active in effecting catalytic cracking of hydrocarbon oils. The refining treatment is carried out preferably at temperatures below 700° F. while the cracking operation is carried out ordinarily at temperatures above 700° F.

The cracking of hydrocarbon oils in the presence of the above-described catalytic material is effected, preferably in the vapor phase, by the continuous passage of hydrocarbons through a suitable reaction zone containing the catalytic material. Preferably, the catalyst also is moved through the reaction zone in a continuous or semi-continuous manner, although operations in which the entire catalyst content of the reaction zone is periodically replaced are within the scope of the invention. The catalyst may be moved substantially continuously through the reaction zone as a consolidated mass or as a stream of falling particles. The catalyst may also pass through the reaction zone in suspension in the stream of hydrocarbon vapors passing therethrough.

In accordance with a preferred embodiment of my invention catalyst which is to be employed as a cracking catalyst is first contacted with vapors of cracked gasoline, or other hydrocarbon oil, under conditions effective to polymerize gum-forming and color-imparting constituents therein while preventing any substantial condensation of liquids in the treating zone. Under these conditions the polymers formed are in part maintained in the vapor phase and withdrawn with the treated vapors and in part deposited on the catalyst in a highly adsorbed or carbonized condition. The catalyst employed in the treating zone is maintained in contact with the vapors being refined for a time sufficient to accumulate upon the catalyst at most a small amount of such deposits. The amount of material deposited upon the catalyst in this manner is restricted to that quantity which maintains the activity of the catalytic material in the promotion of the cracking reaction while effecting a desirable modification of the properties of the catalytic material as a cracking catalyst.

In the use of catalysts of the character described above in the cracking of hydrocarbon oils to gasoline constituents it is found that the initial effect of the catalyst is the formation of cracked products containing a smaller proportion of gasoline constituents than is obtained in the cracked products formed after the catalyst has been in use for a time. It is found that during the initial use of catalytic material of this character the principal product formed is carbon which is deposited upon the catalyst. After some use of the catalyst, and after an appreciable accumulation of carbonaceous deposits on the catalyst, the production of gasoline increases to a maximum. Thereafter the continued accumulation of carbonaceous material on the catalyst effects a gradual decrease in catalytic activity which occurs with increasing rapidity. It is found, therefore, that the proportion of desired constituents is obtained in the cracked product if the catalyst is treated initially to effect accumulation thereon of deposits of the character described above, whereby during the cracking treatment the products contain a maximum proportion of desired constituents such as gasoline.

After employment of the catalyst, in the modification of my invention described above, it may be regenerated in any suitable manner as by burning the carbonaceous deposit from the surface of the catalytic material. Thereafter the regenerated catalyst or any desired proportion thereof may be employed in the refining operation in the manner described.

In accordance with another modification of my invention the catalyst withdrawn from the cracking zone is employed to refine cracked gasoline or other hydrocarbon oil for the removal of gum-forming and color-imparting constituents therefrom. This operation is employed preferably in a manner to supplement the refining treatment in which the catalyst is employed prior to its use as a cracking catalyst. However, the preliminary use of the catalyst in that manner may be dispensed with entirely in favor of the refining treatment employing the catalyst after its use as a cracking catalyst.

In the preferred form of this modification of the invention the refining step is carried out in two stages in the first of which the cracked gasoline or other hydrocarbon oil to be refined is passed in the vapor phase through a treating zone containing catalyst which is partly deactivated for the refining treatment by passage thereof through a catalytic cracking zone. Thereafter the cracked gasoline or other hydrocarbon oil is passed in the vapor phase and in a superheated condition through a second refining zone wherein it is contacted with catalyst which is fresh or regenerated and which is intended for use subsequently in the cracking operation. This method of operation is advantageous in the refining of cracked gasoline containing large amounts of gum-forming and color-imparting materials. Consequently the relatively large amount of polymer product deposited in this treatment is accumulated on catalytic material which is about to undergo regeneration. The removal of the material which is deposited on the catalyst in the refining operation last mentioned is accomplished more easily, in the ordinary method of regeneration by burning with air, than is the removal of the same quantity of material from a smaller quantity of catalyst which, previous to the refining operation, had been substantially free from carbon.

The accompanying drawing is a schematic view of one form of apparatus capable of carrying out the process of my invention. The invention will be described in detail by reference to a process employing the apparatus illustrated in the drawing, but it is to be understood that the invention is not limited to the embodiment thus illustrated but is capable of other embodiments which may be beyond the scope of the apparatus illustrated in the drawing.

Referring to the drawing, high-boiling hydrocarbons, such as gas oil, from any suitable source pass through line 1 and are pumped by pump 2 through line 3 through heating coil 4 of the heating furnace 5. In heating coil 4 the hydrocarbons are heated to a temperature sufficiently high to effect cracking of the hydrocarbons by contact thereof at that temperature with a suitable cracking catalyst. For example, the hydrocarbons may be heated in coil 4 to a temperature between 750° F. and 950° F. If the vaporized hydrocarbons introduced into coil 4 are such that they are completely vaporized therein they are passed through line 9 which connects with the exit of coil 4 and is provided with a valve 8. Line 9 connects with line 10 which in turn connects with a catalytic cracking chamber 11 near the bottom thereof. If the hydrocarbons introduced into coil 4 are such that portions thereof are not completely vaporized at the temperature desired for the cracking reaction valve 8 is closed and the mixture of vaporized and unvaporized hydrocarbons from coil 4 is passed through line 13 which is provided with a valve 6 and connects with an evaporator 14. In evaporator 14 the vapors are separated from the unvaporized oil which is withdrawn through pipe 15 controlled by a valve 16. The separated vapors are withdrawn from evaporator 14 through line 17 which is provided with a valve 7 and connects with line 10 whereby the vapors may be introduced into the lower portion of catalytic cracking chamber 11 in the manner described.

Catalytic cracking chamber 11 contains a mass of cracking catalyst 12 of the character described above. The vaporized hydrocarbons introduced into chamber 11 through line 10 pass upwardly therethrough and in contact with catalyst 12 whereby substantial cracking of the hydrocarbons is effected with the formation of lower-boiling hydrocarbons including the desired product, gas, and solid carbonaceous material which is deposited upon the surface of the particles of catalyst 12.

The cracked products, exclusive of carbonaceous deposits which remain in chamber 11, are withdrawn therefrom through line 18 which connects the upper portion of chamber 11 with a fractionating tower 19. The cracked products, which include unconverted hydrocarbons, lower-boiling normally liquid hydrocarbons, and gases, pass through line 18 into fractionating tower 19 and are subjected therein to conditions of temperature and pressure effective to separate as a condensate hydrocarbons higher boiling than are desired in the product. To facilitate the fractionating operation a portion of the charging stock, or any other suitable hydrocarbon oil, may be introduced into the upper portion of the fractionating tower 19 through pipe 20 which is provided with a pump 21.

The condensate which collects in the lower portion of the fractionating tower 19 is withdrawn therefrom through line 22 from which it may be diverted through line 23 provided with valve 24 to storage. If desired a portion or all of this condensate may be diverted from line 22 through line 25 which connects line 22 with pump 26. The exit of pump 26 is connected by line 27 with line 3 whereby material thus diverted from line 22 is returned to the cracking operation as recycle stock.

The vapors separated in fractionating tower 19, which include the desired hydrocarbon product and lower-boiling hydrocarbons, are withdrawn from fractionating tower 19 through line 28 which connects with a compressor 29. The outlet of compressor 29 connects by means of line 30 with the inlet of a heating coil 31 located in heater 32. Compressor 29 is provided for use in operations wherein it is desired to operate the refining step at a pressure higher than that in chamber 11. The outlet of heating coil 31 connects with the lower portion of a treating or refining chamber 33 which contains catalytic material 34 which is similar in character to catalyst 12.

In the passage of the hydrocarbons through heating coil 31 they are heated to a temperature suitable to effect polymerization of undesired unsaturated constituents on passage of the vapors through refining chamber 33. The vapors which emerge from fractionating tower 19 at the dew point of the mixture are superheated in passage through heating coil 31 to a suitable refining temperature which is below the temperature at which cracking occurs in chamber 33 but is sufficiently high to avoid substantial condensation in chamber 33 upon the formation of the polymers of the undesired constituents. This temperature will depend upon the activity of the catalyst, the degree of refining desired, and the refractoriness of the hydrocarbons undergoing treatment. In general, however, the hydrocarbon vapors introduced into refining chamber 33 will be superheated to the desired extent at temperatures between 300° F. and 700° F.

Any suitable pressure may be employed but in modifications of the invention wherein the vapors undergoing treatment are obtained in a catalytic cracking operation of the character illustrated the use of a higher pressure than that existing in the cracking zone is ordinarily not feasible. The catalytic cracking operation is ordinarily conducted at pressures not substantially greater than atmospheric. However, where the vapors undergoing treatment are not drawn from the catalytic cracking operation the use of substantially higher pressures is desirable.

During the passage of the vapors through chamber 33 the constituents which tend to form gums and color-imparting materials are polymerized by contact with catalyst 34 to higher-boiling hydrocarbons. The polymers thus formed are in part withdrawn from chamber 33 in the vapor form and in part remain in chamber 33 as a deposit on the surface of the particles of catalyst 33. The character of such deposits is affected by the operating temperature. At lower temperatures within the preferred range the high-boiling polymers are retained in a highly adsorbed condition while at higher temperatures substantial carbonization of these deposits occurs. Whatever the condition of these deposits in the refining zone they are rapidly carbonized in the cracking zone. The adsorption of polymers by the catalyst in chamber 33 may result in cracking of the polymers after the catalyst enters chamber 11, with the formation of additional quantities of gasoline and the deposition of carbon.

The vapors are withdrawn from chamber 33 through line 35 which connects the upper portion of chamber 33 with a condenser 36. Condenser 36 is supplied with a cooling medium through pipe 37 whereby normally liquid hydrocarbons contained in the vapors are condensed in condenser 36. The resulting mixture of condensate and uncondensed gases is withdrawn from condenser 36 through pipe 37 and passed into a separator 39. In separator 39 the uncondensed gases are separated and withdrawn through pipe 40 controlled by pressure control valve 41. The condensate separated in separator 39, containing the refined gasoline, is withdrawn through pipe 42 for further treatment as desired.

Fresh catalytic material 43 is supplied to a hopper 44, from a source of supply of fresh catalyst or from a regenerating zone or both. Hopper 44 is connected to refining chamber 33 by a bucket-type rotary valve 45 which is operated by a motor 46. By this means the catalyst is supplied to chamber 33 intermittently but with such short intervals that the effect produced is one of substantially continuous supply of catalytic material to chamber 33. This method of supplying catalytic material to chamber 33 is advantageous in that it permits substantial sealing of the interior of chamber 33 during the supply of catalytic material therethrough. Obviously, any method of supplying catalytic material to chamber 33 may be employed which provides an adequate supply of catalytic material while maintaining a seal on chamber 33.

Instead of the substantially continuous method of supplying catalytic material to chamber 33 a truly intermittent or discontinuous method may be employed whereby at preselected intervals a definite increment is added to the catalytic material in chamber 33 to be counterbalanced by the removal of a similar quantity in the manner described below. The amount of catalytic material to be replaced in chamber 33 in this manner may vary from a small proportion of the total quantity contained in chamber 33 to the whole of that quantity. Depending upon the size of chamber 33 it may be desirable to replace intermittently the whole quantity of catalytic material contained therein.

While the intermittent method of supplying catalytic material to chamber 33 is clearly within the scope of the method of my invention, the method wherein there is substantially continuous supply and removal of catalytic material from chamber 33 is preferred because of the superior effect on the vapors undergoing treatment and the superior effect on the catalytic material in preparing it for subsequent use as a cracking catalyst. The more nearly continuous is the movement of catalytic material through chamber 33 the more uniform is the refining effect on the vapors passing therethrough since the activity of the mass of catalytic material within chamber 33 varies with time to a lesser degree than it would if the catalytic material were replaced partially or entirely at spaced intervals of time. Similarly, the effect of continuous passage of catalytic material through chamber 33 is superior in its effect on the catalytic material in preparing it for future use as a cracking catalyst. Since the formation and deposition of carbonaceous or adsorbed materials within chamber 33 occur to a maximum degree in the portion of chamber 33 adjacent the point of entrance of the vapors undergoing treatment and decrease to a minimum nearer the point of exit of these vapors, it is evident that uniform deposition of heavy materials on the catalyst particles is obtained to a maximum degree when the catalyst is passed through chamber 33 substantially continuously.

The withdrawal of catalytic material from chamber 33 is carried out preferably in a manner which exactly counterbalances the supply of such material to that chamber. In the specific modification illustrated in the drawing a rotary-bucket type valve 47 operated by a motor 48 is provided at the bottom of chamber 33 for the withdrawal of the catalytic material therefrom. It is evident, however, that it is not essential to the invention that the withdrawal of catalytic material from chamber 33 be correlated exactly with the supply of such material. For example, catalytic material may be supplied to chamber 33 intermittently and may be withdrawn continuously if this combination of methods does not provide too great a variation in the quantity of catalytic material maintained in chamber 33.

While the modification of the invention illustrated involves moving the catalytic material through chamber 33 substantially continuously as a consolidated mass, it is evident that the invention includes also within its scope the passage of catalytic material through the refining chamber as a stream of falling particles. Furthermore, the refining catalyst may be passed through the refining reaction zone in suspension in the stream of hydrocarbon vapors passing therethrough.

Any suitable method may be provided for transferring catalytic material withdrawn from chamber 33 to cracking chamber 11. It is evident that the purposes of the invention do not require that catalytic material be transferred directly from chamber 33 to chamber 11, and means may be provided for temporarily storing a substantial quantity of material which has been withdrawn from chamber 33 if variations in the operation of chamber 33 and chamber 11 make this necessary.

For purposes of illustration only, chamber 11 is shown as provided with the same general methods of supply and withdrawal of catalytic material as are provided in connection with chamber 33. Thus, chamber 11 is located directly below chamber 33, and hopper 49 is provided to receive the catalytic material which is discharged from chamber 33 through valve 47. Hopper 49 is connected to cracking chamber 11 through a rotary bucket type valve 50 which is operated by a motor 51. Similarly, a rotary bucket type valve 52 operated by a motor 53 is provided at the bottom of chamber 11 for withdrawing deactivated catalytic material.

Instead of the method of supplying and withdrawing catalyst to and from cracking chamber 11 in the manner illustrated any other suitable method may be employed which supplies and withdraws catalysts substantially continuously while maintaining a seal on chamber 11. Instead of a substantially continuous method of supplying and withdrawing catalytic material to and from chamber 11 an intermittent or discontinuous method may be employed whereby at preselected intervals definite amounts are added and withdrawn to and from chamber 11. The amount of catalytic material to be replaced in chamber 11 in this manner preferably is a small proportion of the total quantity contained in chamber 11, but the employment of a substantially fixed bed of catalytic material which is replaced entirely at spaced intervals is clearly within the scope of the invention. It is evident, furthermore, that it is not essential to the invention that the withdrawal of catalytic material from chamber 11 be correlated exactly with the supply of such material. For example, any combination of continuous or intermittent supply and withdrawal of catalyst may be employed which does not result in too great a variation in the quantity of catalytic material maintained in chamber 11.

While intermittent movement of catalyst through cracking chamber 11 is clearly within the scope of the invention, the substantially continuous movement of catalyst through chamber 11 is to be preferred since the over-all activity of the mass of catalyst contained in chamber 11 is thus maintained substantially uniform with respect to time. The uniform activity of the catalyst in cracking chamber 11 thus provides for uniform conversion of the hydrocarbons passing therethrough whereby the degree of conversion may be maintained at that point which provides maximum recovery of useful products.

In the passage of the vapors to be refined through heating coil 31 the vapors are heated to temperatures substantially above the dew point thereof in order to maintain a temperature in chamber 33 which is sufficiently high with respect to the dew point of the mixture of vapors and polymers which are produced in chamber 33 whereby no substantial condensation occurs in chamber 33. The degree of superheating necessary to accomplish this result depends somewhat upon the quantity of polymers formed in chamber 33. Thus, a gasoline which requires a relatively small degree of refining with the formation of a relatively small quantity of polymers does not require the degree of superheating which would be necessary in the refining of a cracked gasoline containing a large proportion of undesired constituents to be removed by polymerization. Ordinarily, however, the gasoline vapors should be superheated in coil 31 at least 100° F. above the dew point of the mixture.

The temperature of operation of refining chamber 33 is not limited, however, to a temperature which is just high enough to avoid undesired condensation therein. It is advantageous to employ in chamber 33 as high a temperature as is consistent with the avoidance of cracking and the polymerization of constituents which it may be desired to retain in the gasoline product. While cracking of the gasoline constituents in refining chamber 33 is to be avoided, the relative freedom in the control of the temperature therein permits operation of chamber 33 under conditions which may be varied to increase or decrease the quantity of material deposited or adsorbed therein.

The use of a temperature in refining chamber 33 which represents a substantial degree of superheating of the vapors and the limitation of the amount of material deposited or adsorbed on the catalyst before its withdrawal from chamber 33 permits the maintenance of chamber 33 under conditions wherein it has a high refining capacity. Consequently, whereas ordinary refining methods operate at a feed rate of 1 to 4 barrels of gasoline per ton of catalyst per hour, my invention permits the treatment of the gasoline vapors in chamber 33 at a rate of at least 15 barrels per ton of catalyst per hour. The invention thus permits a substantial reduction in the size of equipment necessary in the treatment of a unit quantity of gasoline, aside from the improvements in uniformity of refining action and ease of operation. At the same time the operation of refining chamber 33 under conditions permitting only the accumulation of a small per cent of material on the catalyst prior to its withdrawal through valve 47 supplies catalyst for use in cracking chamber 11 which is best suited to effect, during the passage of the catalyst therethrough, conversion of the hydrocarbon oils with a distribution of products which provides maximum recovery of useful products.

The amount of material which should be deposited upon the catalyst prior to its use as a cracking catalyst depends upon the activity of the catalyst, the character of the hydrocarbon oils undergoing conversion in chamber 11, the degree of conversion desired and the operating conditions employed. Ordinarily, however, the optimum amount of material to be deposited upon the cracking catalyst in the preliminary operation will fall between 0.5 to 2.0 weight per cent. For most operations the preferred amount will be 0.5 to 1.5 weight per cent. The catalyst should be maintained in chamber 33 in contact with the vapors to be refined only for a time sufficient to provide the accumulation of not more than the required amount of deposited or adsorbed material. The quantity of cracking catalyst required is such that a substantial amount of refining catalyst is available for the treatment of the gasoline produced, for example, three tons per barrel. As the refining loss is about 4 per cent and a large proportion of this is not retained in the treating zone, it is evident that complete refining of the gasoline can be accomplished ordinarily by means of the cracking catalyst available without the accumulation of an excessive quantity of material thereon.

The invention has been illustrated by reference to a process in which the hydrocarbon vapors to be refined are formed in the cracking operation employing as catalyst material previously employed in the refining treatment. It is to be understood, however, that the hydrocarbon oil to be treated in chamber 33 need not consist of hydrocarbons formed in chamber 11 but may include or may consist of hydrocarbons from another source.

This application is a continuation-in-part of my prior application Serial No. 218,582, filed July 11, 1938.

I claim:

1. A process comprising passing hydrocarbon oil higher boiling than gasoline through a cracking zone in the vapor phase in contact with finely divided solid silica-alumina cracking catalyst under cracking conditions of temperature, pressure and time of contact to effect substantial cracking of said hydrocarbon oil and formation of gasoline constituents of high anti-knock value, separating from the products of said cracking operation a light fraction containing gasoline constituents, superheating said light fraction substantially above its dew point, passing said superheated light fraction through a treating zone in contact with another portion of said finely divided solid cracking catalyst under polymerizing conditions of temperature, pressure and time of contact effective to remove color-imparting and gum-forming constituents from said light fraction while avoiding substantial decomposition of gasoline constituents of said light fraction, limiting the time of residence of said catalyst in said treating zone to restrict the accumulation of deposited polymerized hydrocarbons to an amount which maintains the activity of said catalyst for the promotion of cracking reactions, and transferring catalyst from said treating zone to said cracking zone.

2. A process comprising passing superheated gasoline hydrocarbon vapors through a treating zone in contact with a finely divided solid silica-alumina cracking catalyst under polymerizing conditions of temperature, pressure and time of contact effective to remove color-imparting and gum-forming constituents from said vapors and deposit polymerized products on said catalyst while avoiding substantial decomposition of said vaporized hydrocarbons, limiting the time of residence of said catalyst in said treating zone to restrict the accumulation of said deposited polymerized hydrocarbons on said catalyst to an extent not substantially greater than two per cent by weight of said catalyst to maintain the activity of said catalyst for the promotion of cracking reactions, withdrawing said catalyst from said treating zone and introducing said withdrawn catalyst into a cracking zone, and passing hydrocarbon oil higher boiling than gasoline through said cracking zone in the vapor phase in contact with said catalyst under cracking conditions of temperature, pressure and time of contact to effect substantial decomposition of said last-mentioned hydrocarbon oil and the formation of gasoline constituents of high anti-knock value.

3. A process comprising passing superheated gasoline vapors through a treating zone in contact with finely divided solid silica-alumina cracking catalyst at a rate of at least 15 barrels (liquid basis) of said gasoline per ton of catalyst per hour under polymerizing conditions of temperature and pressure effective to remove color-imparting and gum-forming constituents of said vapors while avoiding substantial decomposition of said gasoline, limiting the time of residence of said catalyst in said treating zone to restrict the accumulation of deposited polymerized hydrocarbons to an amount which maintains the activity of said catalyst for the promotion of cracking reactions, withdrawing catalyst from said treating zone and introducing said withdrawn catalyst into a cracking zone, and passing hydrocarbon oil higher boiling than gasoline through said cracking zone in the vapor phase in contact with said catalyst under cracking conditions of temperature, pressure and time of contact to effect substantial decomposition of said last-mentioned hydrocarbon oil and the formation of gasoline constituents of high anti-knock value.

4. A process comprising passing superheated gasoline hydrocarbon vapors through a treating zone in contact with finely divided solid silica-alumina cracking catalyst under polymerizing conditions of temperature, pressure and time of contact effective to remove color-imparting and gum-forming constituents from said vapors while avoiding substantial decomposition of said vaporized hydrocarbons, passing said finely divided solid cracking catalyst substantially continuously through said treating zone and then through a cracking zone, limiting the time of residence of said catalyst in said treating zone to restrict the accumulation of deposited polymerized hydrocarbons to an amount which maintains the activity of said catalyst for the promotion of cracking reactions, and passing hydrocarbon oil higher boiling than gasoline through said cracking zone in the vapor phase in contact with said catalyst under cracking conditions of temperature, pressure and time of contact to effect substantial decomposition of said last-mentioned hydrocarbon oil and the formation of gasoline constituents of high anti-knock value.

5. A process comprising passing superheated gasoline hydrocarbon vapors through a treating zone in contact with finely divided silica-alumina cracking catalyst under polymerizing conditions of temperature, pressure and time of contact effective to remove color-imparting and gum-forming constituents from said vapors while avoiding substantial decomposition of said vaporized hydrocarbons, limiting the time of residence of said catalyst in said treating zone to restrict the accumulation of deposited polymerized hydrocarbons to an amount which maintains the activity of said catalyst for the promotion of cracking reactions, withdrawing catalyst from said treating zone and introducing said withdrawn catalyst into a cracking zone, and passing hydrocarbon oil higher boiling than gasoline through said cracking zone in the vapor phase in contact with said catalyst under cracking conditions of temperature, pressure and time of contact to effect substantial decomposition of said last-mentioned hydrocarbon oil and the formation of gasoline constituents of high anti-knock value.

6. A process comprising passing gas oil through a catalytic cracking zone in the vapor phase in contact with finely divided silica-alumina cracking catalyst under cracking conditions of temperature, pressure and time of contact to effect substantial cracking of said gas oil and the formation of gasoline constituents of high anti-knock value, separating from the products of said cracking operation a light fraction containing gasoline constituents, superheating said light fraction, passing said superheated light fraction through a treating zone in contact with finely divided silica-alumina cracking catalyst at the rate of at least 15 barrels (liquid basis) of gasoline constituents per hour per ton of catalyst in said treating zone under polymerizing conditions of temperature, pressure and time effective to remove color-imparting and gum-forming constituents from said vapors and deposit polymerized hydrocarbons on said catalyst while avoiding substantial decomposition of said gasoline constituents, limiting the time of residence of said catalyst in said treating zone to restrict the accumulation of deposited polymerized hydrocarbons to an amount which maintains the activity of said catalyst in the promotion of cracking reactions, and transferring catalyst from said treating zone to said cracking zone.

7. A process comprising passing gasoline vapors superheated to the extent of at least 100° F. through a treating zone in contact with finely divided solid silica-alumina cracking catalyst at a temperature within the range of 300° to 700° F. under conditions of pressure and time of contact effective to polymerize color-imparting and gum-forming constituents contained in said vapors while avoiding substantial decomposition of said vaporized gasoline, limiting the time of residence of said catalyst in said treating zone to restrict the accumulation of deposited polymerized hydrocarbons to an amount which maintains the activity of said catalyst for the promotion of cracking reactions, withdrawing catalyst from said treating zone and introducing said withdrawn catalyst into a cracking zone and passing hydrocarbon oil higher boiling than gasoline through said cracking zone in the vapor phase in contact with said catalyst under cracking conditions of temperature, pressure and time of contact to effect substantial decomposition of said last-mentioned hydrocarbon oil and the formation of gasoline constituents of high anti-knock value.

8. A process comprising passing gas oil through a cracking zone in the vapor phase in contact with finely divided silica-alumina cracking catalyst under cracking conditions of temperature, pressure and time of contact to effect substantial cracking of said gas oil and the formation of gasoline constituents of high anti-knock value, separating from the products of said cracking operation a light fraction containing gasoline constituents, superheating said light fraction to a temperature at least 100° F. above its dew point but below temperatures at which substantial decomposition occurs, passing said superheated light fraction through a treating zone in contact with finely divided silica-alumina cracking catalyst at a rate of at least 15 barrels (liquid basis) of gasoline constituents per hour per ton of catalyst in said treating zone at a temperature within the range of 300° to 700° F. and under conditions of pressure and time of contact effective to polymerize color-imparting and gum-forming constituents contained in said light fraction and deposit polymerized hydrocarbons on said catalyst while avoiding substantial decomposition of gasoline constituents, limiting the time of residence of said catalyst in said treating zone to restrict the accumulation of polymerized hydrocarbons thereon to an amount not substantially greater than two per cent by weight of said catalyst to maintain the activity of said catalyst in the promotion of cracking reactions, and transferring catalyst from said treating zone to said cracking zone.

9. A process in accordance with claim 8 wherein said catalyst is passed substantially continuously in series through said treating zone and said cracking zone.

10. A process comprising passing gasoline vapors superheated to a temperature at least 100° F. above the dew point of the vapors but not sufficiently high to cause substantial decomposition of said gasoline through a treating zone in contact with finely divided solid silica-alumina cracking catalyst at a temperature within a range of 300° to 700° F. under conditions of pressure and time of contact effective to polymerize gum-forming and color-imparting constituents contained in said vapors, limiting the time of residence of said catalyst in said treating zone to restrict the accumulation of deposited polymerized hydrocarbons to an amount which maintains the activity of said catalyst for the promotion of cracking reactions, transferring catalyst from said treating zone to a cracking zone and passing hydrocarbons higher boiling than gasoline through said cracking zone in the vapor phase in contact with said catalyst at a temperature of 750° F. to 950° F. to effect substantial decomposition of said last-mentioned hydrocarbon oil and the formation of gasoline constituents of high anti-knock value.

11. A process comprising passing superheated gasoline hydrocarbon vapors through a treating zone in contact with finely divided solid silica-alumina cracking catalyst under polymerization conditions of temperature, pressure and time of contact effective to remove color-imparting and gum-forming constituents from said vapors while avoiding substantial decomposition of said vaporized hydrocarbons, limiting the time of residence of said catalyst in said treating zone to restrict the accumulation of deposited polymerized hydrocarbons to an amount which maintains the activity of said catalyst for the promotion of cracking reactions to produce gasoline, withdrawing catalyst from said treating zone and introducing said catalyst into a cracking zone, passing hydrocarbon oil higher boiling than gasoline through said cracking zone in the vapor phase in contact with said catalyst under cracking conditions of temperature, pressure and time of contact to effect substantial decomposition of said last-mentioned hydrocarbon oil and the formation of gasoline constituents of high anti-knock value, and maintaining the ratio of catalyst to oil in said cracking zone substantially in excess of the ratio in which the catalyst and the oil in the liquid phase could be mixed to form a non-viscous fluid slurry.

12. A process comprising passing superheated gasoline hydrocarbon vapors through a heating zone in contact with finely divided solid silica-alumina cracking catalyst under polymerizing conditions of temperature, pressure and time of contact effective to remove color-imparting and gum-forming constituents from said vapors while avoiding substantial decomposition of said vaporized hydrocarbons, limiting the time of residence of said catalyst in said treating zone to restrict the accumulation of deposited polymerized hydrocarbons to an amount which maintains the activity of said catalyst for the promotion of cracking reactions to produce gasoline, withdrawing catalyst from said treating zone and introducing said withdrawn catalyst into a cracking zone, heating hydrocarbon oil vapors in the absence of said catalyst to a temperature suitable for effecting substantial cracking of said hydrocarbon oil in the presence of said catalyst, and then passing said heated vapors through said cracking zone in contact with said catalyst to effect substantial decomposition of said vaporized hydrocarbon oil and the formation of gasoline constituents of high anti-knock value.

LOUIS C. RUBIN.